United States Patent [19]

Evers

[11] Patent Number: 5,458,203

[45] Date of Patent: Oct. 17, 1995

[54] DEVICE FOR WORKING THE GROUND

[75] Inventor: Johann Evers, Daarlerveen, Netherlands

[73] Assignee: Evers Research B.V., Daarlerveen, Netherlands

[21] Appl. No.: 39,404

[22] PCT Filed: Oct. 10, 1991

[86] PCT No.: PCT/NL91/00195

§ 371 Date: May 25, 1993

§ 102(e) Date: May 25, 1993

[87] PCT Pub. No.: WO92/06580

PCT Pub. Date: Apr. 30, 1992

Related U.S. Application Data

[63] Continuation-in-part of Ser. No. 848,978, Jun. 15, 1992, Pat. No. 5,259,460.

[30] Foreign Application Priority Data

Oct. 19, 1990 [AU] Australia ............................... 9000157

[51] Int. Cl.$^6$ ..................................................... A01B 5/00
[52] U.S. Cl. .......................... 172/569; 172/739; 172/603; 172/574
[58] Field of Search ................................ 172/574, 569, 172/576, 602, 603, 739

[56] References Cited

U.S. PATENT DOCUMENTS

| | | | |
|---|---|---|---|
| 802,068 | 10/1905 | Case | 172/569 |
| 833,841 | 10/1906 | Maiers | 172/569 |
| 876,145 | 1/1908 | Buchet et al. | 172/569 |
| 1,014,987 | 1/1912 | Weiler | 172/569 |
| 2,659,291 | 11/1953 | Tauke . | |
| 2,768,864 | 10/1956 | Krehbiel . | |
| 3,244,237 | 4/1966 | Keplinger et al. . | |
| 3,675,725 | 7/1972 | Schultz | 172/245 |
| 3,931,858 | 1/1976 | North | 172/63 |
| 4,180,135 | 12/1979 | Birkenbach | 172/407 |
| 4,574,891 | 3/1986 | Williamson | 172/763 |
| 4,607,705 | 8/1986 | Tebben | 172/430 |
| 4,815,544 | 3/1989 | Good | 172/430 |
| 4,928,774 | 5/1990 | Bell | 172/430 |
| 5,259,460 | 11/1993 | Evers | 172/576 |

FOREIGN PATENT DOCUMENTS

| | | |
|---|---|---|
| 280048 | 8/1988 | European Pat. Off. . |
| 2184332 | 12/1989 | United Kingdom . |

Primary Examiner—Randolph A. Reese
Assistant Examiner—Spencer Warnick
Attorney, Agent, or Firm—Webb Ziesenheim Bruening Logsdon Orkin & Hanson

[57] ABSTRACT

A device for working the ground comprising a frame and a plurality of discs is disclosed. Each disc is rotatably mounted on a shaft which is provided on one end of a pivotable standing shaft. In order to prevent jamming of the discs by earth thrown up by adjacent discs, each standing shaft is placed on the concave side of its associated disc. The shafts are inclined relative to the ground with this inclination being adjustable. The spacing between adjacent discs is adjustable as is the orientation of the discs.

10 Claims, 6 Drawing Sheets

DEVICE FOR WORKING THE GROUND

The present application is a continuation-in-part of U.S. patent application Ser. No. 07/848,978, filed on Jun. 15, 1992, now U.S. Pat. No. 5,259,460.

BACKGROUND OF THE INVENTION

The present invention relates to a device for working the ground comprising a frame with a plurality of standing shafts mounted pivotally thereon, moveable setting means connected with the shafts for collectively pivoting the shafts, each standing shaft being provided on a free end with a lying shaft whereon a disc-shaped body is rotatably mounted, wherein each disc-shaped body has a concave and a convex side, and adjacent disc-shaped bodies are arranged in parallel relationship. Such a device is known from the U.S. Pat. No. 3,675,725.

Such a device (normally known as a disc harrow) is used in agriculture for further working of ploughed earth, for ploughing under seed and manure and/or for weed control. It is of great importance in these workings to keep the working depth, i.e. the depth to which the discs work the ground, substantially unchanged. A disc harrow is generally fixed for this purpose to a so-called three-point lifting device that forms part of a tractor and with which the position of the harrow relative to the tractor, and therewith the working depth, is controlled.

The device according to U.S. Pat. No. 3,675,725 differs from conventional disc harrows wherein the discs are jointly fixed to one continuous shaft in that each disc is arranged on the end of a separate, pivotable standing shaft. This has the great advantage that the angle between the rotating shaft of the discs and the direction of movement of the tractor (the setting angle) can be varied without a continuous shaft having to be swivelled for this purpose through the desired setting angle. Thus prevented is that the discs on one of the outer ends of the harrow are moved far behind the tractor and that their working depth can no longer be properly controlled by the lifting device. In the device according to U.S. Pat. No. 3,675,725 the setting angle of the discs can be varied without the distance between the discs and the tractor changing, whereby, using the lifting device, a virtually constant working depth can be simply maintained.

The disc harrow known from the U.S. Pat. No. 3,675,725 has the great drawback, however, that the standing pivot shafts are placed on the convex side of the discs connected thereto. This results in the danger of earth thrown up by an adjacent disc collecting and clogging between the standing pivot shaft and the disc, whereby the discs can jam.

It should be noted that from the U.S. Pat. No. 2,768,864, a disc harrow is known having a plurality of discs arranged in parallel on a transverse bar, each disc having an associated shank extending downwardly and rearwardly from the transverse bar and being placed on the concave side of the disc. This patent, however, relates to disc harrows having their discs quite close together, whereas the disc harrow of the present invention has its discs relatively far apart, to accommodate their pivotal movement.

SUMMARY OF THE INVENTION

The present invention has for its object to provide a ground working device of the above described type wherein the above stated drawback does not occur. This is achieved according to the invention in that each pivotable standing shaft is placed on the concave side of its associated disc-shaped body. Thus obtained is a reliable and robust disc harrow with separately pivotable discs which is suitable for use in a large number of ground types.

In preference the convex side is smooth. This prevents earth possibly clogging on the convex side whereby bearings that may run through the disc-shaped bodies to the convex side could become jammed.

A very good working of the ground is obtained when during working each lying shaft runs in inclined position relative to the ground. Each disc thereby as it were "digs" the ground whereby this is well loosened.

In order to prevent earth that may be carried onto the concave side of a disc being able to collect between the disc and its pivot shaft, whereby the disc could become jammed, the distance between each pivot shaft and its associated disc-shaped body increases in the direction from the rotational center point of the body to its rim.

When the frame comprises a fixed part and at least one part bearing the pivot shafts and mounted in the fixed part for pivoting about a lying axis running substantially transversely of the working direction, the angle of slope enclosed by the ground and the rotational axes can be varied in simple manner.

The soil working device can be further provided with a device arranged at the rear of the frame for attaching a height-adjustable cultivator. Because the cultivator tends to dig itself into the ground the working depth of the discs is kept constant to an even greater extent.

BRIEF DESCRIPTION OF THE DRAWINGS

Mentioned and other features of the device according to the invention will be elucidated on the basis of an embodiment, wherein reference is made to the annexed drawing in which corresponding reference numerals designate corresponding components, and wherein.

DESCRIPTION OF THE PREFERRED EMBODIMENTS

Figure 1:
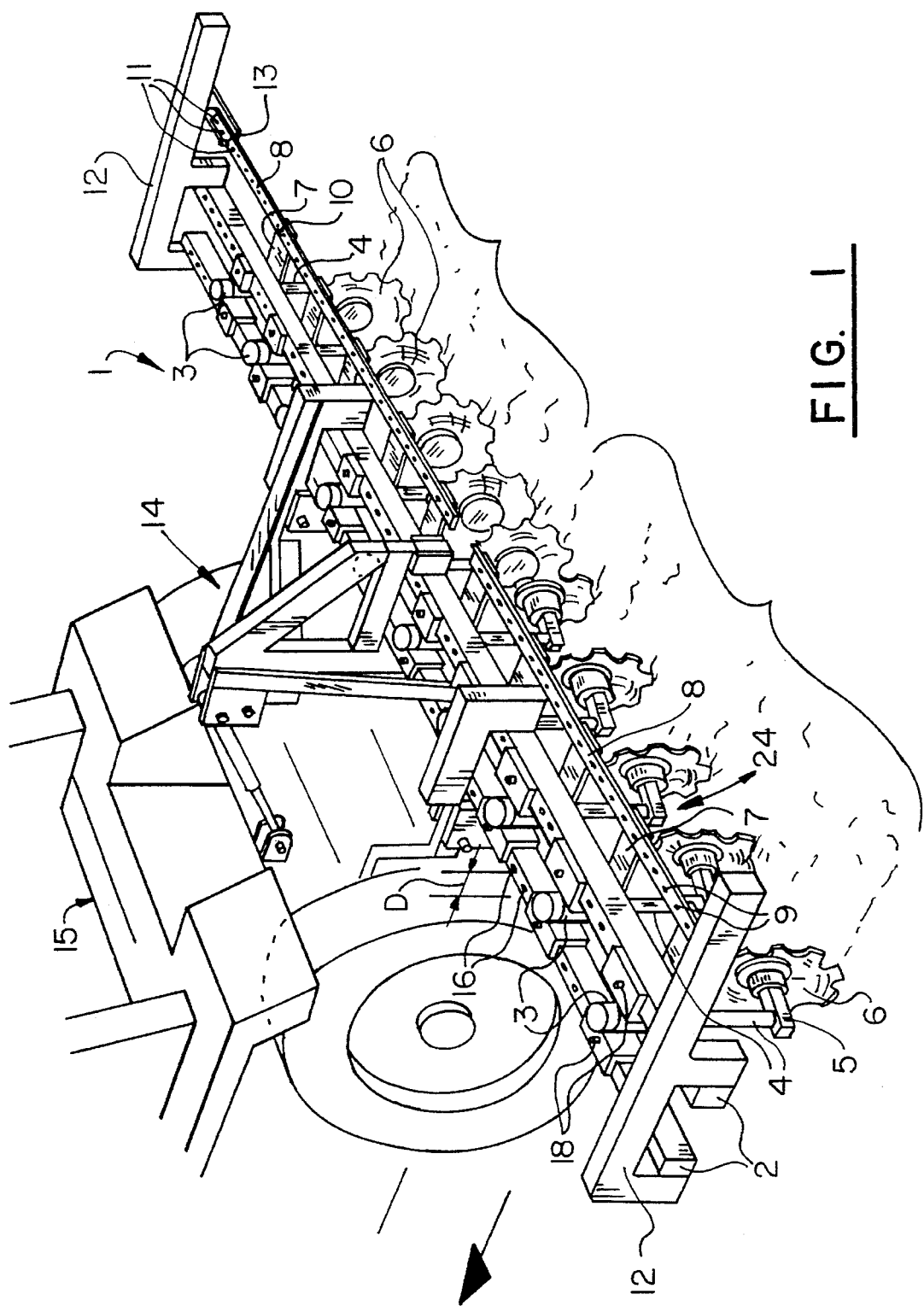
FIG. 1 shows a perspective view of a first embodiment of the device according to the invention.

A ground working device 1 (FIG. 1) normally designated as a disc harrow comprises a frame 2 in divided form whereon at regular mutual intervals between both parts bearing means 3 are suspended by means of gripping members 23. Pivotally mounted in the bearing means 3 are the first outer ends of standing shafts 4. The free ends of the standing pivot shafts 4 are provided with lying shafts 5 on which disc-shaped bodies 6 are rotatably mounted. The pivot shafts 4 are arranged on the concave side of each disc-shaped body 6 so that earth thrown up by an adjacent disc-shaped body 6 cannot collect and clog between the pivot shaft 4 and the disc-shaped body 6. Jamming of the disc-shaped body 6 is thus prevented.

For adapting of the setting angle of the disc-shaped bodies 6 the disc harrow 1 is provided with setting means 24.

Because the disc-shaped bodies 6 are each pivotable relative to the frame 2 the latter does not have to swivel relative to the direction of movement of the tractor 15. The distance D between the rear wheels of tractor 15 and the device 1 can thereby be minimal and owing to the short-moment arm the working depth of the disc-shaped bodies 6 can be well controlled by the lifting device of an agricultural tractor 15.

Figure 2:
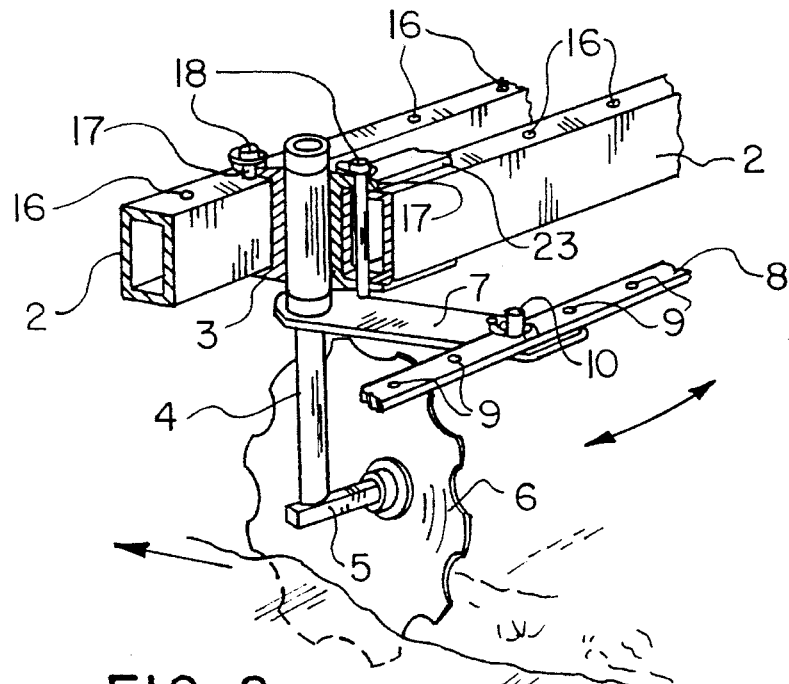
FIG. 2 is a partially sectional view of a detail of the setting means of the device.

Fixed to each pivot shaft 4 is a first extremity of a radially extending adjusting body 7 (FIG. 2). The other extremity of the body 7 is provided with a hole which co-acts with an opening 9 arranged in an adjusting member 8 and with detachable pin-like fixation means 10 to attach the adjusting body 7 pivotally to the adjusting member 8. The outer end of the adjusting member 8 is likewise provided with a number of openings 11 which co-act with an opening arranged in a connecting member 12 joining both frame parts 2, 2 and second detachable pin-like fixation means 13 to fix the adjusting member 8 in a determined position relative to the frame 2.

The disc harrow 1 further comprises a frame 14 with which the harrow 1 is attached to a three-point lifting device arranged on the rear of tractor 15. In order to prevent the occurrence of transverse forces and moments around the top axis of the tractor 15 the harrow 1 in the embodiment shown here is of symmetrical construction relative to the centre line of the tractor 15.

To change the setting angle of the disc-shaped bodies 6 the disc harrow 1 is raised by the lifting device so far that the disc-shaped bodies 6 are free of the ground, whereafter the pin-like fixation means 13 connecting an opening 11 and an opening in the connecting member 12 is released, the adjusting member 8 is moved such that the disc-shaped bodies 6 are pivoted by the adjusting bodies 7 in the desired direction and the disc-shaped bodies 6 are fixed in their new position by placing the releasable pin-like fixation means 13 through one of the other openings 11 and the opening in the connecting member 12.

Figure 3:
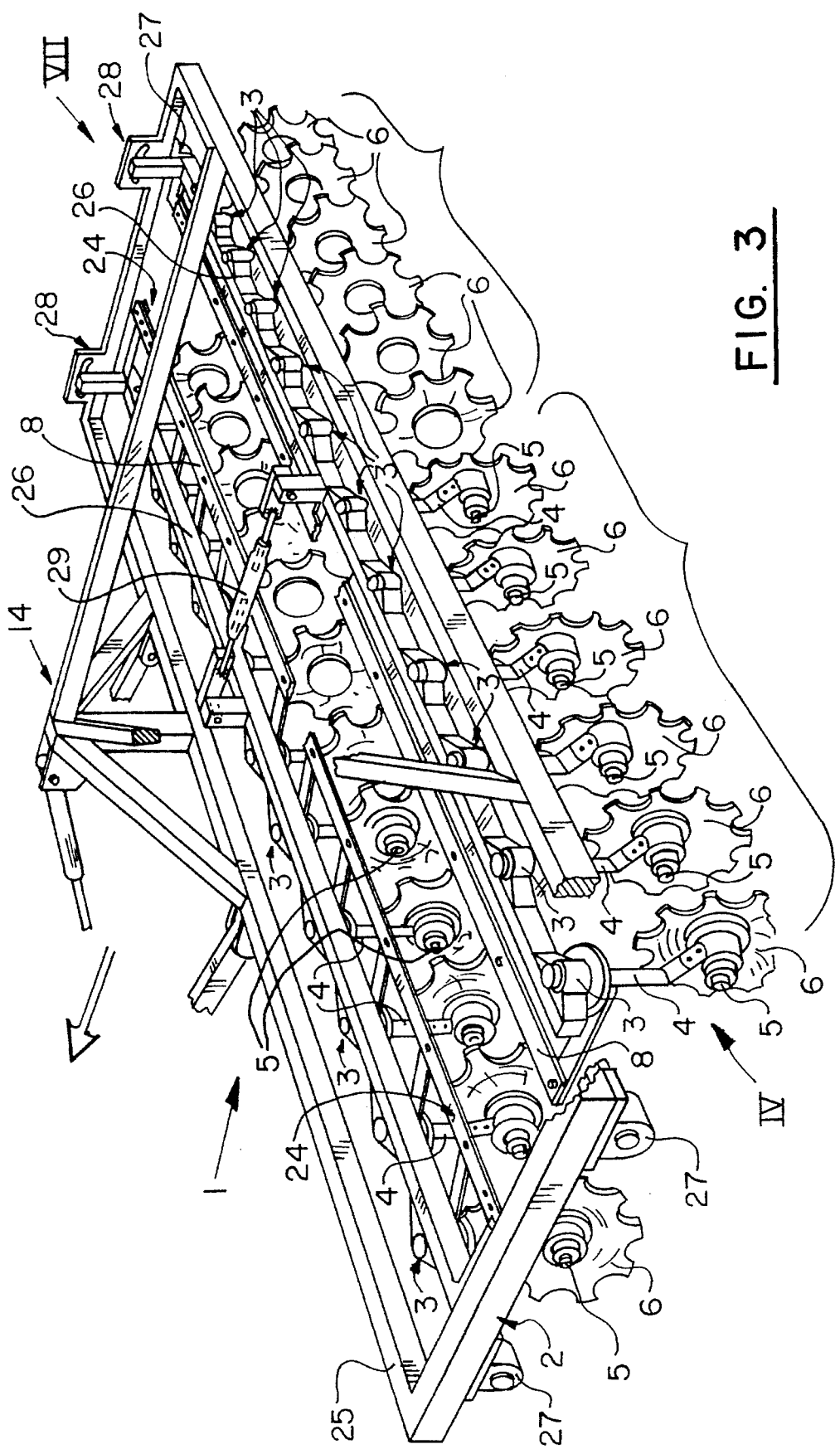
FIG. 3 shows a perspective view of a second embodiment of the device according to the invention.

In a second embodiment of the disc harrow 1 according to the invention shown in FIG. 3, the frame 2 comprises a fixed part 25 in addition to two pivotable parts 26 which bear the pivot shafts 4 and are pivotable about a lying axis running substantially transversely of the working direction indicated by the arrow (FIG. 3). The pivotal parts 26 are mounted in bearings 27 attached to the fixed part 25. The angle of pivot of the pivotable parts 26 relative to the fixed part 25 of frame 2 can be set using setting means 28, as will be described below. The pivotable parts 26 are mutually connected by adjustable connecting means 29.

Figure 4:
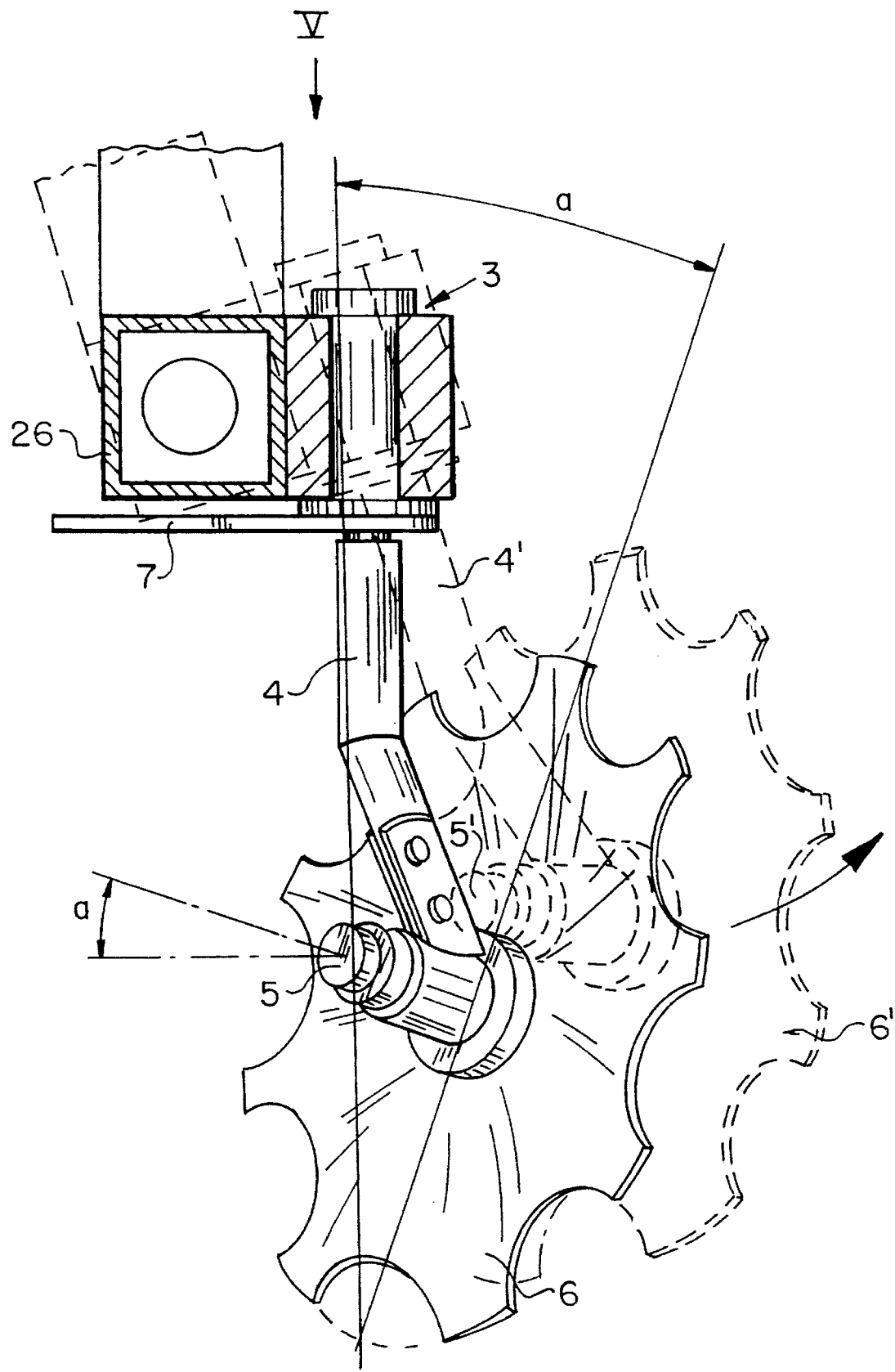
FIG. 4 shows a detail of a pivot shaft with disc-shaped body along the arrow IV in FIG. 3.

Each rotating shaft 5 (FIG. 4) of the disc harrow 1 according to the second embodiment of the invention lies at an inclination relative to the ground during working. The disc-shaped body thereby "digs" in the ground whereby the ground is properly churned loose. The optimal value of the angle of inclination "a" enclosed by the rotating shaft 5 and the ground depends on differing conditions, such as type of ground, the crop cultivated and/or to be cultivated thereon and the presence and/or type of any weeds etc. In FIG. 4, angle "a" for clarity is also illustrated between the vertical and a line perpendicular to the rotating shaft 5. Angle values of between 1° and 50° are however suitable, wherein values of between 20° and 30° are preferred. In the embodiment shown the angle "a" amounts to roughly 26°. The angle "a" can be varied by pivoting the pivotable part 26 of frame 2 relative to the fixed part 25 as indicated with dashed lines. The rotating shafts 5 then follows an arced path. Each standing pivot shaft 4 is mounted in bearing means 3 which are releasably arranged on the pivotable members 26 and displaceable between different positions located substantially transversely of a working direction at mutual distances on the pivotable member 26.

The shape of the standing pivot shaft 4 is adapted to the curvature of the disc-shaped body 6 such that the distance between the pivot shaft 4 and the disc-shaped body 6 increases in the direction from the center point of the body to its rim. Embodying the pivot shaft 4 and the disc-shaped body 6 diverging in this manner prevents any earth adhering to the concave side of the body 6 from collecting at the location of the pivot shaft 4, whereby the disc-shaped body 6 would still become jammed.

Figure 5:
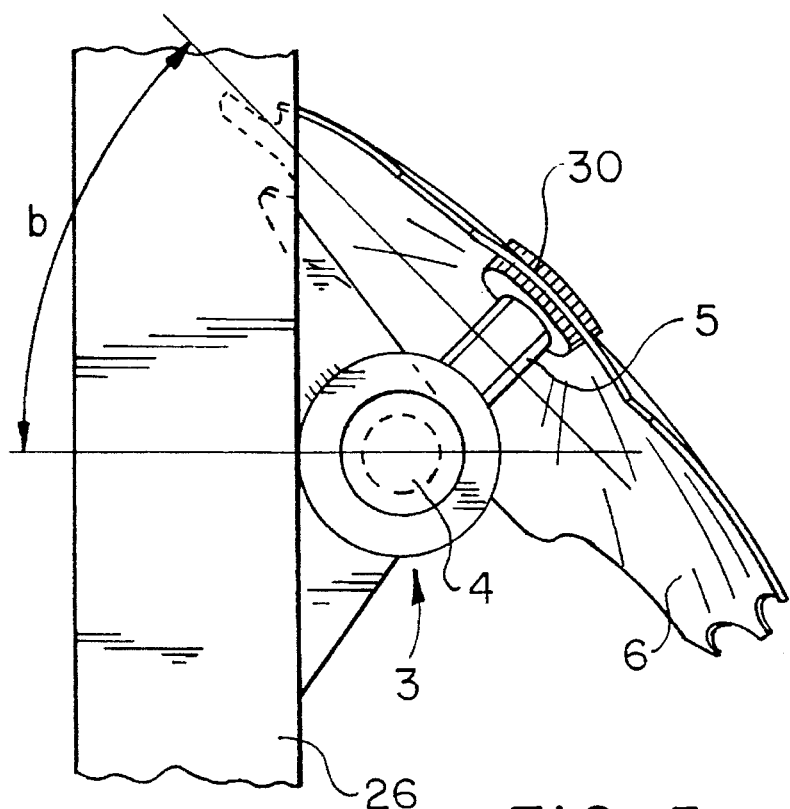
FIG. 5 is a top view along the arrow V in FIG. 4.

The setting angle "b" (FIG. 5) is selected like the angle of inclination "a" in accordance with the type of ground, the sort of cultivated crop and/or type of weed. The figure once again clearly shows the sloping disposition of the disc-shaped body 6. The latter is arranged in the embodiment shown about a bearing 30 which therefore extends on the convex side of the disc-shaped body.

Figure 6:
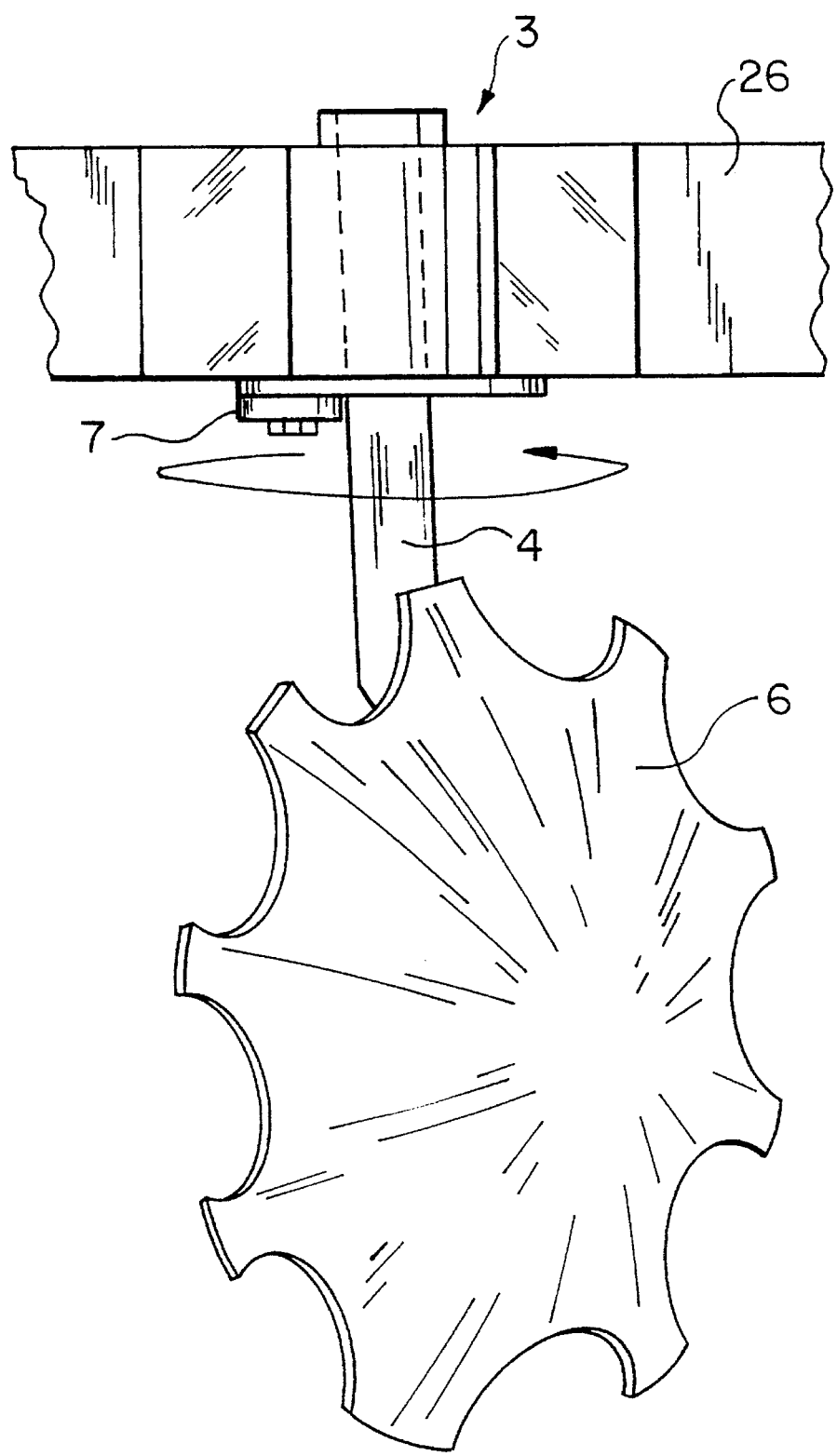
FIG. 6 shows a rear view of a disc-shaped body according to a third embodiment of the invention.

It is however also possible for the bearing 30 to be placed against the disc-shaped body 6 on the concave side, so that the convex side of the body remains substantially smooth (FIG. 6). There is then no danger whatever that the action of the bearing 30 can be affected by the thrown-up earth.

Figure 7:
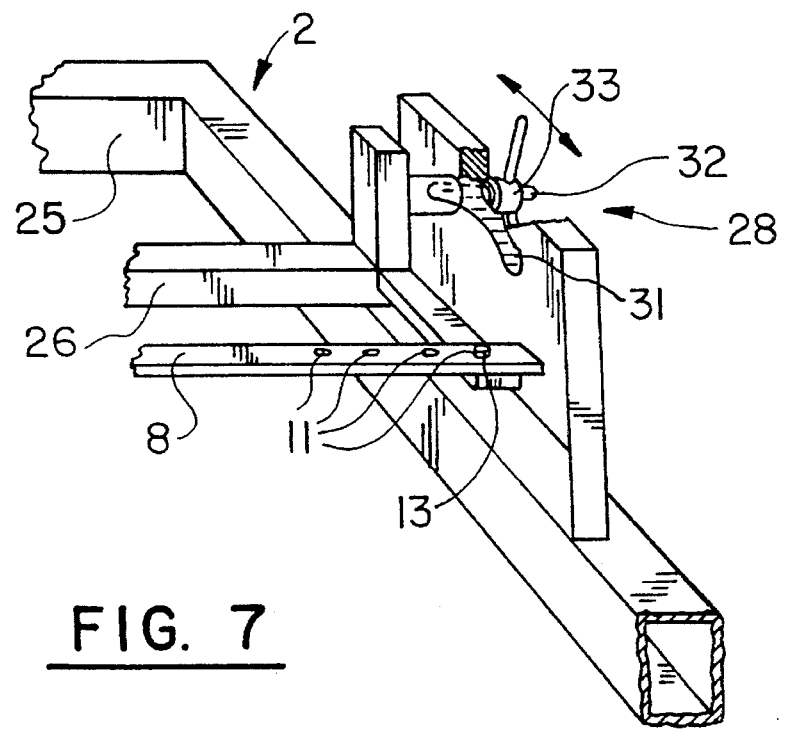
FIG. 7 shows a detail along the arrow VII in FIG. 3.

The angle of pivot between the pivotable part 26 and the fixed part 25 of the frame 2 is set using adjusting means 28 which are formed by a slot 31 arranged in the fixed part 25 and a bolt 32 movable therein, which bolt is fixedly connected to the pivotable part 26 and provided with a clamping nut 33 (FIG. 7). The pin-hole connection 13, 11 shown in this figure for adjusting the desired setting angle "b" of the disc-shaped bodies 6 can of course be replaced simply by another setting mechanism, such as a spindle for instance.

Situations are conceivable where it is desired to select different pivot angles for the two pivotable parts 26 of frame 2, in order to obtain a varying degree of "digging" action in the two rows of disc-shaped bodies 6. This may be required because the first row of disc-shaped bodies 6 encounters generally as yet unworked ground while the second row of disc-shaped bodies 6 comes into contact with ground already worked by the first row. In order to enable such variations in the pivot angle the connecting means 29 between the first and second pivotable part 26 are adjustable (FIG. 3).

It may be desired to vary the distance in transverse direction between the various disc-shaped bodies 6. To this end the bearing means 3 in which each standing pivot shaft 4 is mounted can be releasably arranged on the frame (FIG. 1). The bearing means 3 can then be displaced in transverse direction and fixed in particular desired positions by means of pin-hole connections 16–18.

Figure 8:
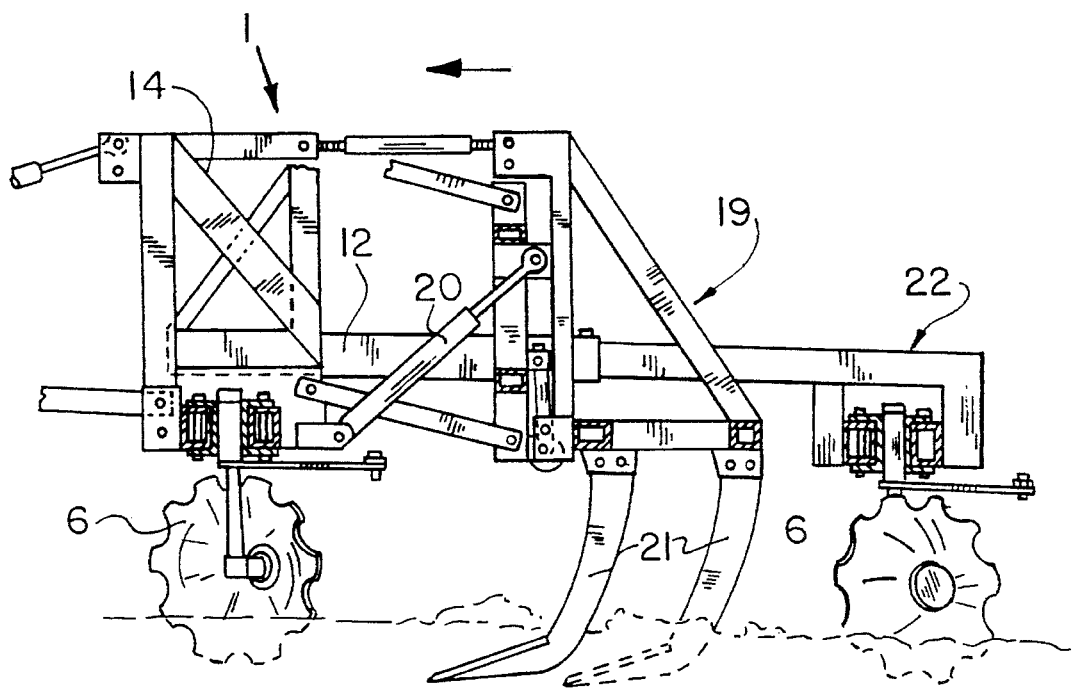
FIG. 8 is a side view of a device according to the invention having attached thereto a cultivator and a second device according to the invention.

By attaching a cultivator 19 to the frame 14 of the first disc harrow 1 in the manner shown in FIG. 8 the working depth of the disc-shaped bodies 6 can be precisely controlled. The position of the cultivator 19 relative to the disc harrow 1 is controlled using (for instance hydraulic) adjusting means 20. When the harrow 1 is lowered by the lifting device fixed to tractor 15 the teeth 21 of the cultivator will dig themselves in and, depending on the position of the adjusting means 20, pull the disc-shaped bodies 6 of the device 1 to a greater or lesser degree into the ground. Thus obtained is a virtually constant working depth.

The embodiment of the device 1 shown here comprises a second device 22 according to the invention fixed to the elongation of connecting members 12, 12. The addition of a second disc harrow 22 is of importance if the first harrow 1 is provided with disc-shaped bodies 6 which are all positioned in the same direction and which is thus asymmetrical. Use of a single disc harrow 1 results namely in such a case in the occurrence of transverse forces and moments making the tractor 15 difficult to control.

I claim:

1. The device for working the ground comprising:

a frame, at least one pivotable member rotatably mounted on said frame for rotation about a first axis, and a means for pivoting said pivotable member about said first axis and for securing said pivotable member at a proper orientation about said first axis;

a plurality of standing pivot shafts mounted pivotally on said pivotable members, each said standing pivot shaft configured to rotate about a standing pivot shaft axis;

moveable setting means connected with said plurality of standing pivot shafts for collectively pivoting said plurality of standing pivot shafts about said standing pivot shaft axes;

a mounting shaft connected to an end of each said standing pivot shaft; and a disc-shaped body rotatably mounted on each said mounting shaft, wherein each said disc-shaped body has a concave and a convex side, wherein each said standing pivot shaft is positioned on said concave side of its associated disc-shaped body.

2. The ground working device as claimed in claim 1, wherein said convex side of each said disc-shaped body is substantially smooth.

3. The ground working device as claimed in claim 1, wherein during working each said mounting shaft is positioned in an inclined position relative to the ground.

4. The ground working device as claimed in claim 3, wherein each said mounting shaft encloses an angle with the ground of between 1° and 50°.

5. The ground working device as claimed in claim 4, wherein each said mounting shaft encloses an angle with the ground of between 20° and 30°.

6. The ground working device as claimed in claim 1, wherein said frame includes a plurality of said pivotable members which are mutually joined by an adjustable connecting means.

7. The ground working device as claimed in claim 1, wherein each said standing pivot shaft is mounted in bearing means releasably arranged on said pivotable member and displaceable between different positions located substantially transversely of a working direction at mutual distances on said pivotable member.

8. The ground working device as claimed in claim 1, further including means arranged at a rear of said frame for attaching a height-adjustable cultivator.

9. The ground working device as claimed in claim 1, wherein said means for pivoting and securing said pivotable member of said frame includes a slot formed in said frame, a bolt extending from said pivotable member moveable within said slot, and a clamping nut coupled to said bolt configured to secure said bolt at a proper orientation within said slot.

10. The working device for working the ground as set forth in claim 1, wherein said first axis is transverse to said pivot shaft axes and the working direction of said device.

* * * * *